(No Model.)
N. H. McGREGOR.
FISH LINE REEL.
No. 520,607. Patented May 29, 1894.
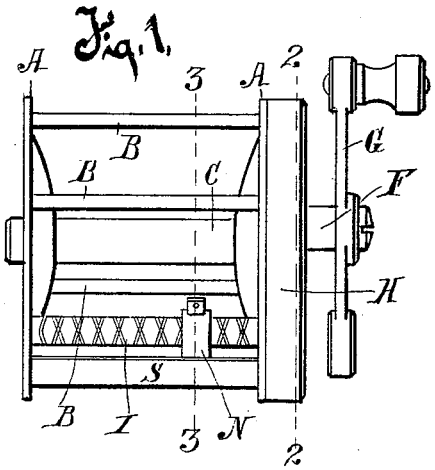
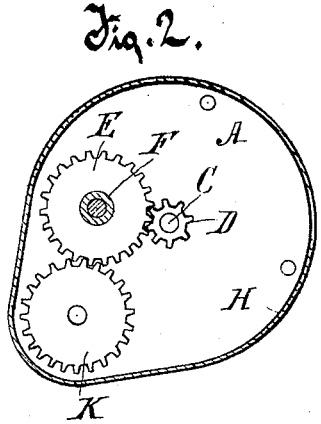
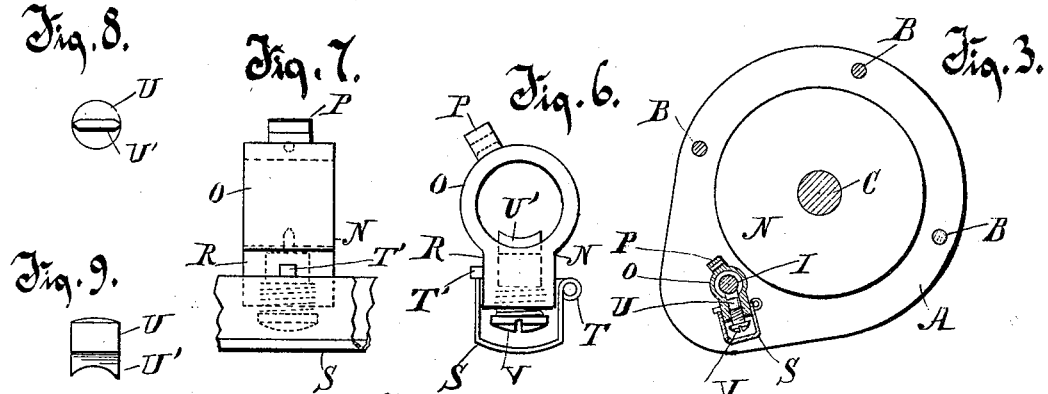
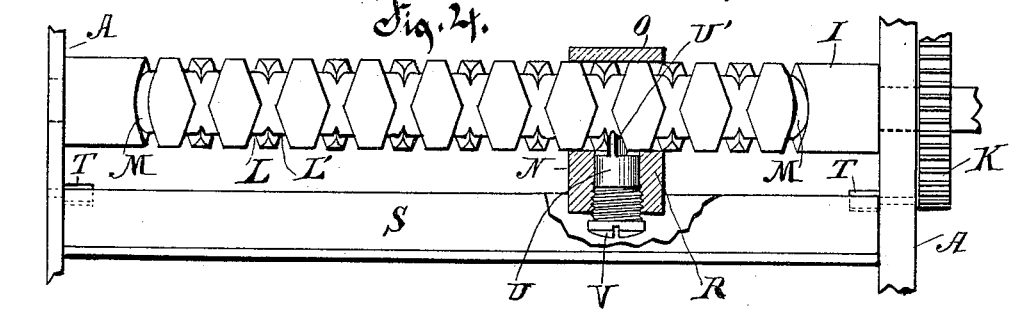
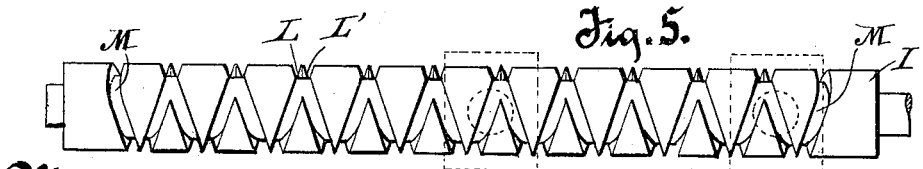
Witnesses.
Inventor.
Nelson H. McGregor,
By Benedict & Morsell
Attorneys.

UNITED STATES PATENT OFFICE.

NELSON H. McGREGOR, OF MILWAUKEE, WISCONSIN, ASSIGNOR OF ONE-HALF TO CORNELIUS WHEELER, OF SAME PLACE.

FISH-LINE REEL.

SPECIFICATION forming part of Letters Patent No. 520,607, dated May 29, 1894.

Application filed October 27, 1893. Serial No. 489,327. (No model.)

*To all whom it may concern:*

Be it known that I, NELSON H. McGREGOR, of Milwaukee, in the county of Milwaukee and State of Wisconsin, have invented a new and useful Improvement in Fish-Line Reels, of which the following is a description, reference being had to the accompanying drawings, which are a part of this specification.

My invention has relation to improvements in fish line reels, and particularly to that class of reels wherein means are provided for regularly winding the line spirally on the reel shaft, first in one direction and then in the other direction, in regular layers.

The object is to provide, in the class of fish line reels above referred to, in connection with the guide traveling along the reversely screw threaded shaft, means whereby not only a way is provided for the longitudinal travel of the guide, but, at the same time, provision for readily gaining access to the part engaging the reverse grooves of the shaft for the purpose of removing the said part. It is a well known fact that in fish line reels provided with reversely grooved shafts in which pins, or equivalents, engage the grooves, such pins are subjected to a great amount of wear, and it is therefore an advantage to provide some simple means, such as herein shown and described, for readily removing the pin or part, for the purpose of replacing the same by a new one.

My invention consists of the devices and their parts as hereinafter described and claimed, or their equivalents.

In the drawings, Figure 1, is an elevation of a complete reel with my improved devices in connection therewith. Fig. 2, is an outline of the gear of the reel taken on line 2—2 of Fig. 1 looking toward the left. Fig. 3, is a transverse section of the reel, and my improved devices taken on line 3—3 of Fig. 1, looking toward the left. Fig. 4, is an enlarged view of my improved devices, parts being broken away and other parts being shown in section for convenience of illustration. Fig. 5, is another view of the worm or screw, which forms a part of my improved devices, the view being at an angle of about forty-five degrees to the view in Fig. 4. Fig. 6, is an outline of the traveling guide, and related parts. Fig. 7, is a view of the same parts seen in Fig. 6, at a right angle thereto. Figs. 8 and 9 are details.

The reel proper, consists of the end pieces A A, the rods B B securing the end pieces together at a distance from each other, the shaft C mounted centrally in the end pieces, the pinion D on the shaft C, the gear wheel E fixed on an arbor F, a hand crank G secured to the arbor F and adapted by its rotation to revolve the shaft C, and a cap H secured to the end piece A, and covering the gears and furnishing a bearing for the arbor F. Reels containing substantially the same parts as those thus far specifically described are in common use.

The letter I indicates a doubly and reversely screw threaded shaft or worm parallel with the shaft C and journaled in the end pieces A. This worm is provided with a fixed gear wheel K which meshes with the wheel E, and is rotated thereby. Two reversely disposed spiral channels L L' are cut in the shaft forming the double screw or worm I. These spiral grooves cross each other regularly on the shaft and at their extremities at each end of the shaft they run into and vanish in each other as seen at M, by a diminishing and practically omitted inclination to the axis of the shaft. On this worm I there is a non-revoluble traveling guide N, consisting of a band or ring O fitted and loose on the worm shaft I, which ring at one side has a lug P, having a transverse aperture through which the fish line runs when being wound on or unwound from the shaft C. At the other side of the ring there is a projection or boss R adapted to travel freely along in a way, consisting of a channeled cap S. The boss R traveling in this way prevents the ring O from rotating on or with the worm I. The cap S is hinged at its extremities at T T to the end pieces A A whereby it can be swung from over the boss R. One edge of the cap S rests normally on a lug T' projecting laterally from the boss R. This cap S, besides serving as a way for guiding and controlling the movements of the guide N, serves also as a cover and guard for the guide. A block or pin U loose in a radial aperture therefor in the boss R is provided at its inner end with a flattened and laterally elongated part U' which projects through the ring O and rides in the grooves L L' in the worm I. The pin U is held up to its work by the plug screw V turning in the boss R against the pin loosely, in the aperture in which it is located.

It will be understood that in use, as the shaft C is revolved by the rotation of the crank handle G, the worm I will also be revolved and that the guide N being held against revolution by the ways S will be caused to travel longitudinally of the worm along it first in one direction and then in the other, and that thereby the line running through the lug P will be regularly wound back and forth on the shaft C in succeeding layers, thus obviating any bunching of the line together at any point on the shaft C.

In Fig. 5 I have shown in dotted lines the relation of the guide and the pin U to the worm when traveling in reverse directions. As the cap S forms a cover or guard for the guide N, as well as a way along which it travels, this form of guide or way is for this reason more desirable than a simple bar forming a way along which the guide might travel would be.

No means for attaching the reel to a pole, have been shown, as such means are in common use and form no part of my invention.

Having thus described my invention, what I claim, and desire to secure by Letters Patent, is—

1. In a fish line reel, the combination, of a revoluble reversely grooved shaft, a guiding ring loose on the grooved shaft, said ring provided with a projecting boss having a threaded aperture therethrough, a pin loose in and projecting from the aperture of the boss to engage and travel in the grooves of the shaft, means for holding the pin to the grooves, said means engaging the threaded aperture of the boss, and adapted to permit of the entire removal of the pin, and means for holding the guiding ring against revolution, substantially as set forth.

2. In a fish line reel, the combination, of a revoluble reversely grooved shaft, a guiding ring loose on the grooved shaft, said ring provided with a projecting boss having an interiorly threaded aperture, a pin loose in and projecting from the aperture of the boss, and engaging and traveling in the grooves of the shaft, a screw plug engaging the threads of the aperture of the boss, and adapted, when screwed inward, to bear against the end of the pin, and hold said pin to its work, and when unscrewed, to permit of the removal of the pin, and means for holding the guiding ring against revolution with the grooved shaft, substantially as set forth.

3. In a fish line reel, the combination, of a revoluble reversely grooved shaft, a guiding ring loose on the grooved shaft, said ring provided with a projecting boss having a threaded aperture therethrough, a pin loose in and projecting from the aperture of the boss, and engaging and traveling in the grooves of the shaft, a screw plug engaging the threads of the aperture of the boss, and adapted, when screwed inward, to bear against the end of the pin, to hold said pin to its work, and a hinged cap forming a channel in which the projecting boss fits and travels, and is prevented thereby from rotating, said cap, when thrown back upon its hinges, adapted to permit of the unscrewing of the plug, and the removal of the pin, substantially as set forth.

In testimony whereof I affix my signature in presence of two witnesses.

NELSON H. McGREGOR.

Witnesses:
C. T. BENEDICT,
ANNA V. FAUST.